(12) United States Patent
Brown et al.

(10) Patent No.: US 12,373,983 B2
(45) Date of Patent: *Jul. 29, 2025

(54) METHOD AND SYSTEM FOR MONOCULAR DEPTH ESTIMATION OF PERSONS

(71) Applicant: Hinge Health, Inc., San Francisco, CA (US)

(72) Inventors: Colin Brown, Montreal (CA); Louis Harbour, Montreal (CA)

(73) Assignee: Hinge Health, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,175

(22) Filed: Nov. 22, 2023

(65) Prior Publication Data

US 2024/0087161 A1   Mar. 14, 2024

Related U.S. Application Data

(63) Continuation of application No. 17/804,909, filed on Jun. 1, 2022, now Pat. No. 11,875,529, which is a (Continued)

(30) Foreign Application Priority Data

Jun. 14, 2019  (CA) ...................... 3046612

(51) Int. Cl.
*G06T 7/00*  (2017.01)
*G06T 3/40*  (2006.01)
(Continued)

(52) U.S. Cl.
CPC ................. *G06T 7/73* (2017.01); *G06T 3/40* (2013.01); *G06T 7/50* (2017.01);
(Continued)

(58) Field of Classification Search
CPC .... G06T 7/73; G06T 3/40; G06T 7/50; G06T 2207/20081; G06T 2207/20084;
(Continued)

(56) References Cited

U.S. PATENT DOCUMENTS 10,679,046 B1   6/2020   Black et al.
11,004,230 B2   5/2021   Pollefeys et al.
(Continued)

FOREIGN PATENT DOCUMENTS

CN   108549876 A   9/2018
WO   2017133009 A1   8/2017
WO   2018087933 A1   5/2018

OTHER PUBLICATIONS

International Search Report and Written Opinion mailed Jun. 23, 2020 for International Patent Application No. PCT/IB2020/052936 (7 pages).
(Continued)

*Primary Examiner* — Ping Y Hsieh
(74) *Attorney, Agent, or Firm* — Perkins Coie LLP; Andrew T. Pettit

(57) ABSTRACT

Systems and methods are provided for estimating the 3D joint location of skeleton joints from an image segment of an object and a 2D joint heatmaps comprising 2D locations of skeleton joints on the image segment. This includes applying the image segment and 2D joint heatmaps to a convolutional neural network containing at least one 3D convolutional layer block, wherein the 2D resolution is reduced at each 3D convolutional layer and the depth resolution is expanded to produce an estimated depth for each joint. Combining the 2D location of each kind of joint with the estimated depth of the kind of joint generates an estimated 3D joint position of the skeleton joint.

19 Claims, 8 Drawing Sheets

Related U.S. Application Data continuation of application No. 17/644,221, filed on Dec. 14, 2021, now Pat. No. 11,354,817, which is a continuation of application No. PCT/IB2020/052936, filed on Mar. 27, 2020.

(51) Int. Cl.
  *G06T 7/50* (2017.01)
  *G06T 7/73* (2017.01)
(52) U.S. Cl.
  CPC .............. *G06T 2207/20081* (2013.01); *G06T 2207/20084* (2013.01); *G06T 2207/30196* (2013.01)
(58) Field of Classification Search
  CPC . G06T 2207/30196; G06T 7/75; G06N 3/045; G06N 3/048; G06N 3/084
  See application file for complete search history.

(56) References Cited

U.S. PATENT DOCUMENTS

| | | | |
|---|---|---|---|
| 11,568,533 | B2 | 1/2023 | Anssari Moin et al. |
| 2019/0209046 | A1* | 7/2019 | Addison .............. A61B 5/1135 |
| 2019/0278983 | A1* | 9/2019 | Iqbal ...................... G06N 3/084 |
| 2020/0125877 | A1* | 4/2020 | Phan ...................... G06N 20/10 |
| 2020/0160535 | A1* | 5/2020 | Ali Akbarian ......... G06N 5/046 |
| 2020/0273192 | A1* | 8/2020 | Cheng .................. G06V 10/454 |
| 2020/0302634 | A1 | 9/2020 | Pollefeys et al. |
| 2022/0292714 | A1 | 9/2022 | Brown et al. |

OTHER PUBLICATIONS

Mazhar, Osama , et al., "Towards Real-time Physical Human-Robot Interaction using Skeleton Information and Hand Gestures", Azhar Osama et al: "Towards Real-Time Physical Human-Robot Interaction Using Skeleton Information and Hand Gestures", 2018 IEEE/RSJ International Conference on Intelligent Robots and Systems (IROS), IEEE, Oct. 1, 2018 (Oct. 1, 2018), pp. 1-6.

Tome, Denis , et al., "Lifting from the Deep: Convolutional 3D Pose Estimation from a Single Image", Denis Tome et al: "Lifting from the Deep: Convolutional 3D Pose Estimation from a Single Image", arxiv.org, Cornell University Library, 201 Olin Library Cornell University Ithaca, NY 14853, Jan. 1, 2017, 12 pages.

Xu, Weipeng , et al., "Mo2Cap2: Real-time Mobile 3D Motion Capture with a Cap-mounted Fisheye Camera", Xu Weipeng et al: "Mo2Cap2: Real-time Mobile 3D Motion Capture with a Cap-mounted Fisheye Camera", IEEE Transactions on Visualization and Computer Graphics, IEEE, USA, vol. 25, No. 5, May 1, 2019, pp. 2093-2101.

Cao, Zhe et al., "Realtime Multi-Person 2D Pose Estimation using Part Affinity Fields", Zhe Cao et al: "Realtime Multi-Person 2D Pose Estimation using Part Affinity Fields", arxiv.org, Cornell University Library, 201 Olin Library Cornell University Ithaca, NY 14853, Nov. 24, 2016, 9 pages.

Zhou, Xingyi , et al., "Towards 3D Human Pose Estimation in the Wild: A Weakly-Supervised Approach", Zhou Xingyi et al: "Towards 3D Human Pose Estimation in the Wild: A Weakly-Supervised Approach", 2017 IEEE International Conference on Computer Vision (ICCV), IEEE, Oct. 22, 2017, pp. 398-407.

Muraoka, Taro , et al., "Motion Capturing System from Video Images", Technical Report of the Institute of Electronics, Information and Communication Engineers, vol. 101, No. 737, Mar. 2002, pp. 97-104.

Popa, Alin-Ionut , et al., "Deep Multitask Architecture for Integrated 2D and 3D Human Sensing", 2017 IEEE Conference on Computer Vision and Pattern Recognition, Jul. 21, 2017, pp. 4714-4723.

* cited by examiner

METHOD AND SYSTEM FOR MONOCULAR DEPTH ESTIMATION OF PERSONS

CROSS-REFERENCE TO RELATED APPLICATIONS

This application is a continuation of U.S. patent application Ser. No. 17/804,909, filed on Jun. 1, 2022, which is a continuation of U.S. patent application Ser. No. 17/644,221, filed on Dec. 14, 2021, issued as U.S. Pat. No. 11,354,817, which is a continuation of International Patent Application No. PCT/IB2020/052936, filed on Mar. 27, 2020, which claims priority to Canadian Patent Application No. 3,046,612, filed on Jun. 14, 2019. All the aforementioned patent applications are hereby incorporated by reference in their entireties.

TECHNICAL FIELD

This disclosure relates to methods and systems for the estimation of relative three-dimensional (3D) positions of persons' joints in image or video data from a monocular camera. In particular, it relates to a machine learning-based approach that estimates relative depth values of one or more persons' joints from a camera.

BACKGROUND

Monocular estimation of relative 3D positions or depth values, namely the distances from the camera, of human joints, or any anatomical landmarks such as elbows, eyes, toes, etc., has broad ranging applications including motion capture, virtual and augmented reality, sports analytics, personal training and activity recognition.

In particular, 3D joint estimation from standard Red-Green-Blue (RGB) image data with no additional depth sensing hardware facilitates the broadest set of use cases. Depth sensing hardware is often expensive and limiting in its use, such as having a limited range and may only be used inside. However, deriving 3D positions without additional hardware is challenging since using input data from a single RGB image excludes the possibility of triangulation.

Mathematically, determining the depth of a human joint from a two-dimensional (2D) position in a single image is ill-posed, but methods that use prior and contextual information to tackle this issue have been proposed. Modern methods typically use machine learning-based models and largely fall into two categories. First, lifting methods accept previously detected 2D joint positions (or skeletons) of a person and generate 3D positions corresponding to the most likely pose, typically using a fully-connected neural network model. Secondly, convolutional neural network (CNN)-based methods use learned 2D convolutions to extract features from an input image containing a person that are fed into a regression model on the 3D positions or depths.

Lifting approaches are limited by the fact that 2D skeleton data is missing visual cues such as shadows, occlusions, lighting and volume (e.g., apparent scale of different joints) that may be critical for correctly determining the relative depth of a joint. While CNN-based approaches have access to such cues, extracted image features are inherently 2D (since the 2D convolutions operate on 2D maps) in contrast to the 3D nature of the output. Furthermore, CNN-approaches don't typically have a priori knowledge of 2D joint positions, and instead must infer these positions while inferring the associated depths.

In part due to these limitations, existing approaches often exhibit limited accuracy and robustness, especially in challenging poses, environments and conditions. Thus, there exists the need for a better approach to monocular RGB estimation of human joint depths.

SUMMARY

Systems and methods are provided for estimating the 3D joint location of skeleton joints from an image segment of an object and a 2D joint heatmaps comprising 2D locations of skeleton joints on the image segment. This includes applying the image segment and 2D joint heatmaps to a convolutional neural network containing at least one 3D convolutional layer block, wherein the 2D resolution is reduced at each 3D convolutional layer and the depth resolution is expanded to produce an estimated depth for each joint. Combining the 2D location of each kind of joint with the estimated depth of the kind of joint generates an estimated 3D joint position of the skeleton joint.

BRIEF DESCRIPTION OF THE DRAWINGS

In drawings which illustrate by way of example only a preferred embodiment of the disclosure.

DETAILED DESCRIPTION

Figure 1:
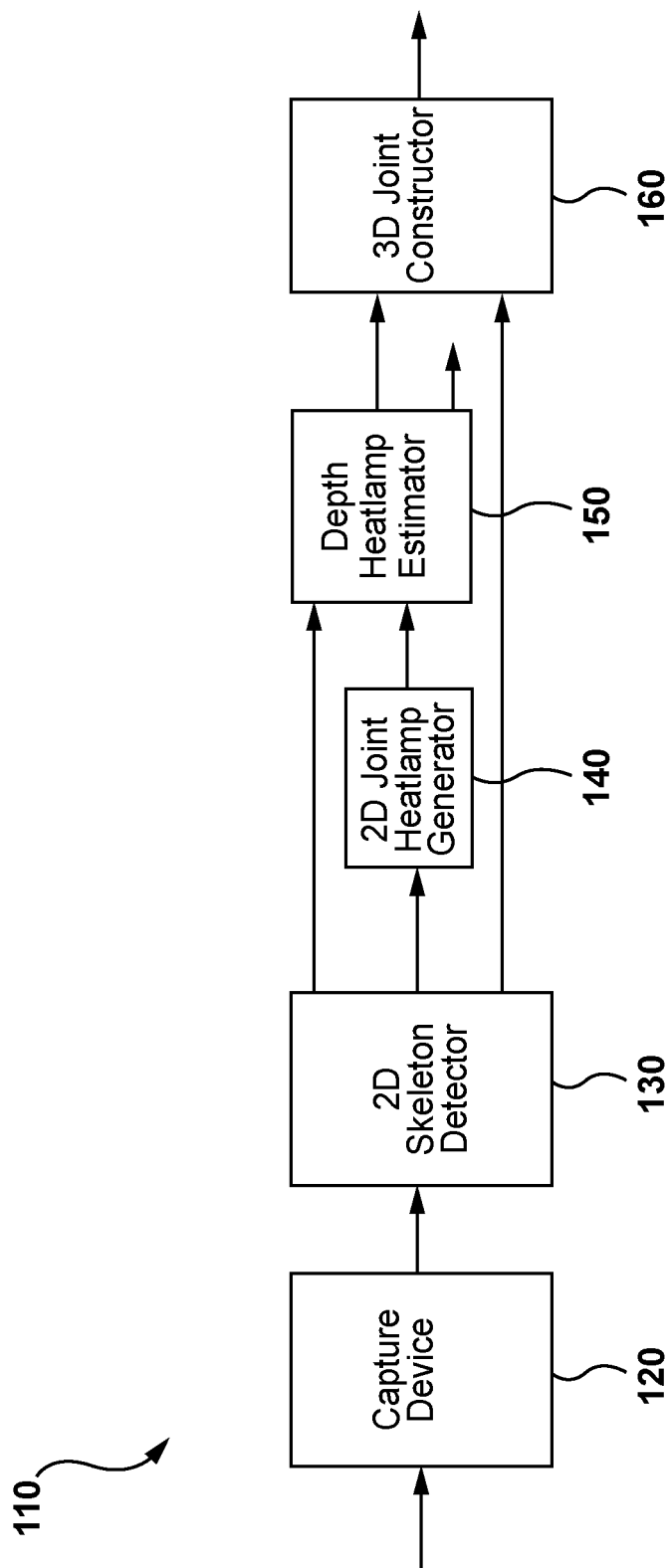
FIG. 1 is a representation of the high-level architecture of an embodiment of the 3D pose estimation system.

With reference to FIG. 1, the human joint 3D estimation system 110 may comprise a capture device 120 to capture a digital image, a 2D skeleton detector 130, which may detect and crop humans in an image and localize human joint positions in the image, a 2D joint heatmap generator 140, which may generate a positional heatmap for each kind of joint to be localized, a depth heatmap estimator 150, which may generate 1D depth heatmaps for each kind of localized joint, and a 3d joint constructor 160, which may select a depth value for each kind of joint from the depth heatmaps and combine this information with the 2D joint positions to produce 3D joint positions.

A capture device 120 may represent any device or method for acquiring a digital image or video frame, such as a digital camera, webcam, mobile device, video camera, streaming source (e.g., videos or images streamed from the web) or stored image content such as an image or video database. The image format may be a 3-channel RGB or be encoded in some other color space (such as sRGB, CMYK). The image may or may not include additional image channels, such as from depth sensors or infra-red sensors.

A 2D skeleton detector 130 may detect one or more persons in an image. For each detected person, the 2D skeleton detector may output a cropped image centered around that person. Each output cropped image may be resized to a specific resolution (e.g., 256×256 pixels), which may be independent of the input resolution or size of the detected person.

For each detected person, a 2D skeleton detector may also output the detected positions, such as the 2D co-ordinates, of a pre-defined plurality of kinds of human joints. The joints may be anatomical landmarks. For instance, the 2D joint detector may localize the positions of all visible instances of key joints. This may include 22 kinds of joints, including left wrist, right wrist, left knee, base of neck. The 2D joint detector may provide these detected joints as a plurality of co-ordinates, grouped by detected person. The co-ordinates of the joints for each detected person may be provided in one array of numbers.

A 2D skeleton detector may be embodied by an existing software module such as from Open Pose, or wrnchAI or some other software or hardware modules that can detect persons and localize human joints in an input image.

A 2D joint heatmap generator 140 may accept a plurality of detected joint positions for one person and produce a heatmap image for each kind of joint. A heatmap image for one kind of joint may convey the locations of a plurality of detected joints of that kind as a corresponding plurality of markers in the image localized at those 2D joint positions. A marker may be a Gaussian kernel. For example, the location may include a standard deviation of 8 pixels or some other size. The location may be in the form of a flat disk or any other localized kernel image.

A 2D joint heatmap generator 140 may instead output 2D joint heatmaps generated directly by the 2D skeleton detector 130, depending on the available outputs of that module. For example, some 2D skeleton detectors may output 2D joint heatmaps directly. In this case the 2D joint heatmap generator may be a part or submodule or the 2D skeleton detector.

Each heatmap image output by the 2D joint heatmap generator, corresponding to one kind of joint, may be encoded in a single channel. The value of each pixel of that channel may approximate the likelihood of a joint of a given kind being detected at that pixel. The resolution of the heatmap images may be the same resolution as the cropped image of a single person detected by the 2D skeleton detector, such as 256×256 pixels.

Figure 8:
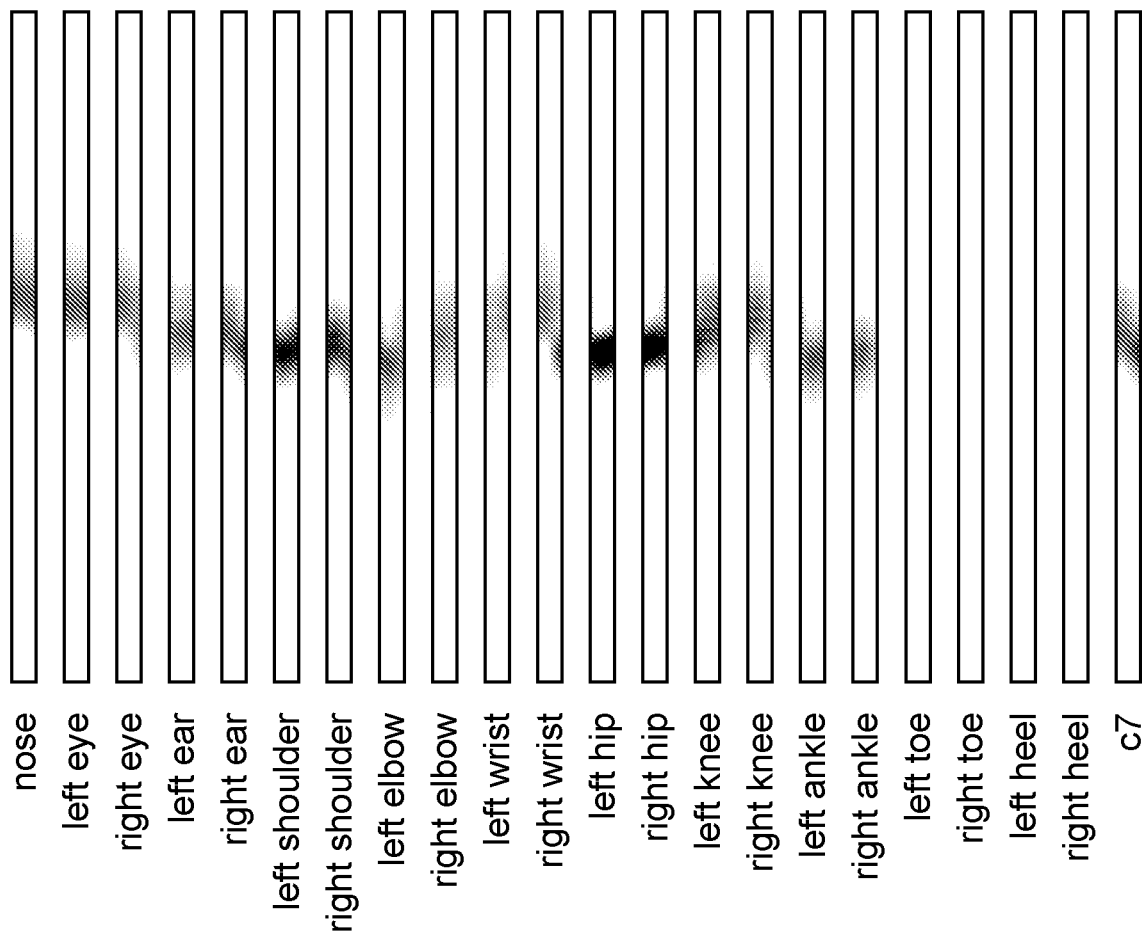
FIG. 8 is an example of a plurality of output depth heatmaps (depth range is horizontal) corresponding to a plurality of kinds of joints to be localized.

A depth heatmap estimator 150, may accept as input an image centered on the likeness of one person along with 2D heatmap images representing the locations of a predefined plurality of kinds of joints of that person and output a plurality of 1D depth heatmaps. The number of depth heatmaps may correspond to the number of input 2D heatmaps. This may also correspond to the number of kinds of joints detected by the 2D skeleton detector. Each depth heatmap may represent a range of depth values of one kind of joint relative to some fixed point. This fixed point may be the center of the hips of the person, the furthest joint from the camera, or some other point of reference. With reference to FIG. 8, a depth heatmap may be stored as 1D array of pixels (e.g., 256 pixels), with each pixel corresponding to a relative depth value. The value of each pixel of each depth heatmap may represent the likelihood of the corresponding joint being at that relative depth.

A depth heatmap estimator may be embodied by a trained machine learning model. This model may be a convolutional neural network (CNN), or alternatively a RNN, random forest, or deep neural network. The architecture of the CNN model may contain 3D convolutional layers that may extract 3D features (such as object boundaries, occlusions, spatial orderings, texture and colour patterns, lighting features) from the input data. The CNN model may also contain 2D convolution layers, residual units, restricted linear activation units (ReLU, or other activations such as sigmoid units), batch normalization layers, max pooling layers and reshape layers. These layers may be organized into logical blocks such as 2D CNN blocks and 3D CNN blocks, chained end-to-end.

The CNN may be organized in a pyramidal fashion such that 2D resolution is reduced at each block and depth resolution is expanded correspondingly, extracting 3D features with increasing fidelity while maintaining an efficient and bounded use of memory.

A 2D CNN block may extract low-level image features and expand the receptive field by performing an initial reduction in spatial resolution (i.e., pooling). A 2D CNN block may comprise a 2D convolutional layer, a residual unit, a max pooling layer (for example with a 2×2×1 kernel size) and a final 2D convolutional layer. Batch normalization layers may be inserted after each convolutional layer to impose batch normalization. The convolution layer may for example have a 7×7 kernel size and stride 2. The residual unit may have 3 convolutional layers with a skip connection.

The importance of the inclusion of a 2D CNN block may depend on memory and computational considerations as the reduction in spatial resolution performed by this block can reduce the memory and computational cost of subsequent layers, for example 3D convolution layers that may be relatively computationally expensive.

A 3D CNN block may comprise a 3D convolution, and ReLU, followed by another 3D convolution and ReLU, followed by a max pooling layer and a reshape layer. Batch normalization layers may be inserted after each convolutional layer to impose batch normalization. Each 3D convolution may have a kernel size of 3×3×3 to reduce the computational cost and number of learnable parameters required for each subsequent layer.

Figure 2:
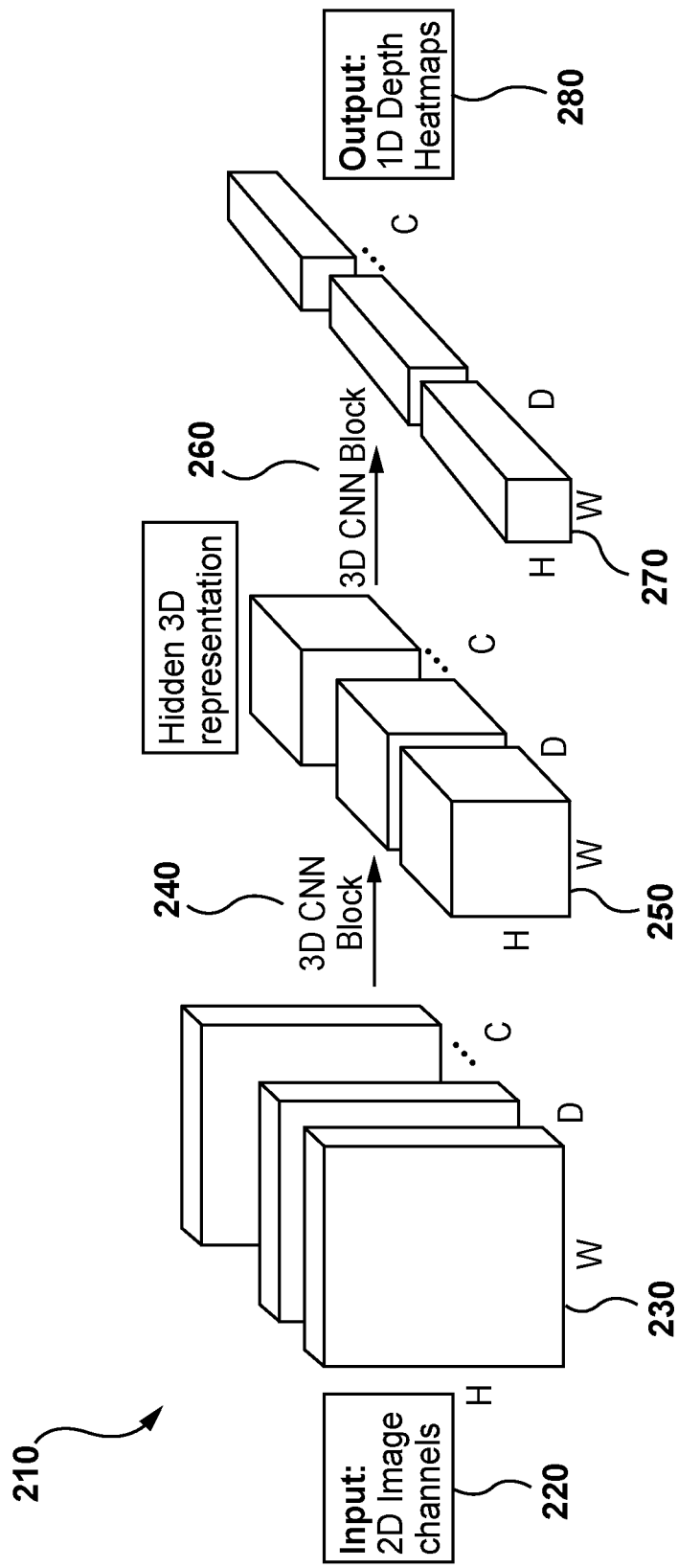
FIG. 2 is a representation of an example of a reduction in spatial dimension sizes and an increase in the depth dimension size via 3D CNN blocks.

Each max pooling layer of the 3D CNN block may reduce the size of the input spatial dimensions, H and W, for example by a factor of 2 each, but maintain the depth dimension, D. Each reshape layer may reduce the number of channels produced by the pooling layer and increase the size of the depth dimension accordingly, for example by a factor of 4. Thus, with reference to FIG. 2, each 3D CNN block may effectively reduce the H and W dimensions while expanding the D dimension proportionally.

Figure 3:
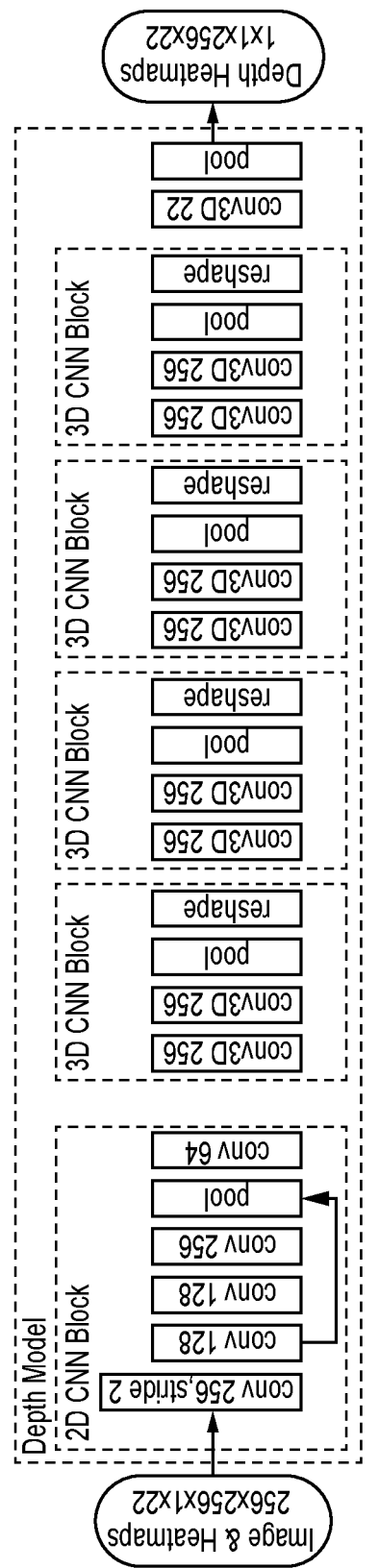
FIG. 3 is a schematic representation of an embodiment of a depth heatmap estimator showing one 2D CNN block and four 3D CNN blocks.

With reference to FIG. 3, the depth heatmap estimator may comprise a 2D CNN block, one or more 3D CNN blocks, for example 4 blocks, followed by one (or more) final 3D convolutional layers and a final max pooling layer. The final 3D convolutional layers may output a number of channels equal to the number of kinds of joints to be estimated, for example 22. The final max pooling layer may reduce the original spatial dimensions, W and H down to 1 each, leaving only an expanded depth dimension for each joint channel.

Figure 4:
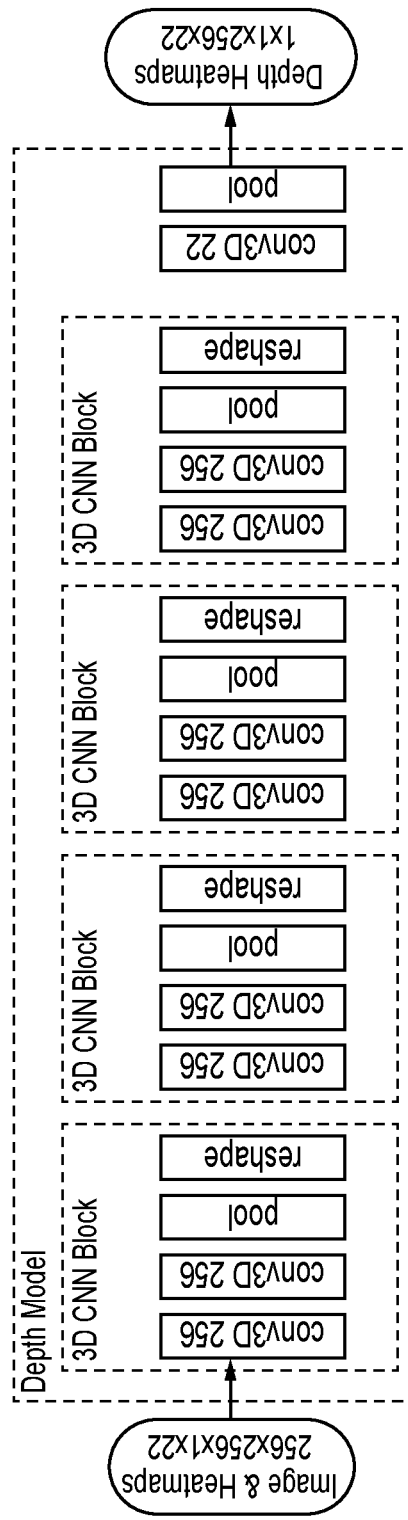
FIG. 4 is a schematic representation of an embodiment of a depth heatmap estimator showing four 3D CNN blocks and no 2D CNN blocks.
Figure 5:
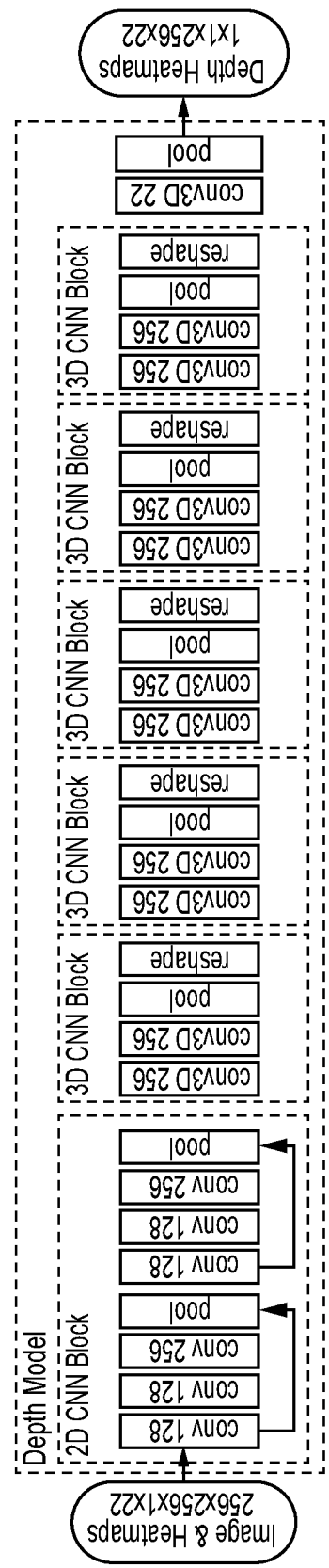
FIG. 5 is a schematic representation of an embodiment of a depth heatmap estimator with a 2D CNN block of two residual units and five 3D CNN blocks.
Figure 6:
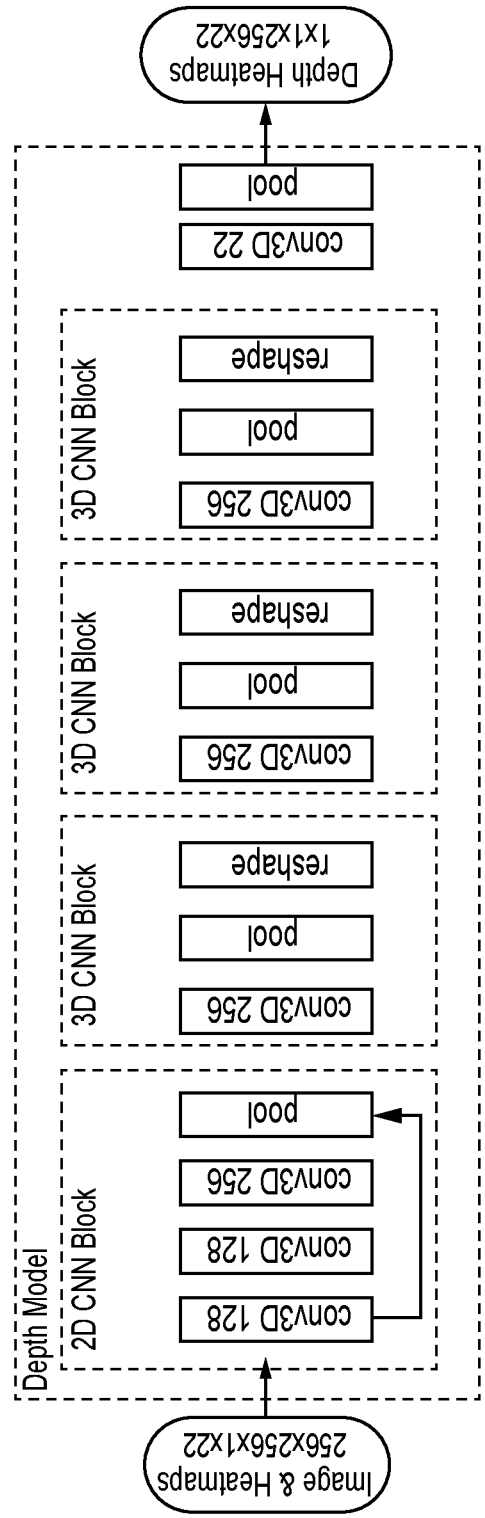
FIG. 6 is a schematic representation of an embodiment of a depth heatmap estimator with one 2D CNN block and three 3D CNN blocks, each containing one convolutional layer.

The architecture of a depth heatmap estimator may vary based on specific requirements of the task including memory constraints, runtime constraints, training database size, and other similar factors. For example, with reference to FIG. 4, the depth heatmap estimator may contain no 2D blocks. With reference to FIG. 5, 2D CNN blocks may comprise more than one residual unit and the depth heatmap estimator may contain more than four 3D blocks. With reference to FIG. 6, the depth heatmap estimator may contain fewer than four 3D blocks and each 3D block may contain different numbers of stacked 3D convolutional layers.

More 3D convolutional layers in each block may enable the extraction of more complex 3D features but at the expense of more required computations and a larger memory footprint during training. Thus the specific number of convolutional layers per block in a given embodiment may depend on requirements of the application.

For ease of reference, in FIG. 3, FIG. 4, FIG. 5 and FIG. 6, ReLU and batch normalization layers are not shown although may be present.

Learnable parameters of the depth heatmap estimator may be trained with an appropriate training set. The training may use back propagation, or another appropriate learning algorithm. A solver method such as RMSProp, or gradient descent, ADAM or similar may be used. A training framework such as TensorFlow, Caffe, or PyTorch or similar framework may be used. The training set may comprise a set, such as thousands, of images of persons in different poses, settings and lighting conditions, each associated with labelled 3D joint positions. As an example the COCO dataset may be used.

The 3D joint constructor 160 may accept 2D joint positions for one detected person, for example from the 2D skeleton detector 130, and corresponding joint depth heatmaps, produced by the depth heatmap estimator 150, and output 3D joint positions. A depth component of a 3D joint position may be computed from a depth heatmap via the argmax function. Alternatively, a weighted sum function or a peak detection technique may be used. Input 2D joint positions and computed depth values may be combined to produce 3D joint positions.

Figure 7:
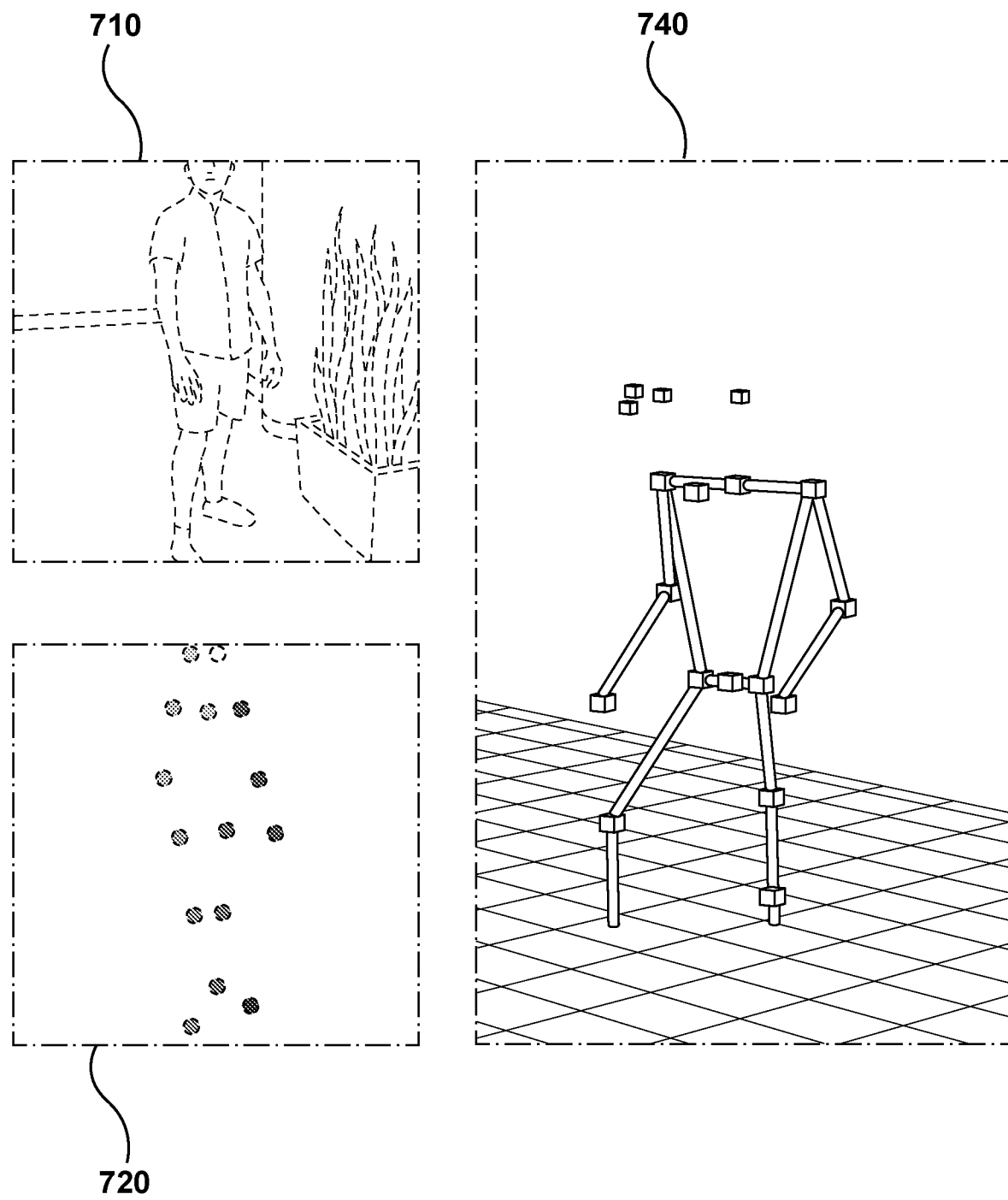
FIG. 7 is a representation of an example input image, a colorized representation of the corresponding input heatmaps and an example of the corresponding 3D joint positions, portrayed as a skeleton.

An example of a plurality of 3D joint positions generated from one embodiment of the human joint 3D estimation system is portrayed in FIG. 7. An input image representing a human figure 710 is provided along with a 2D joint heatmap 720 such as generated by a 2D joint heatmap generator 140. Although not represented in the heatmap 720, each kind of joint, such as left wrist, would have a separate heatmap. The heatmaps for all detected joints are overlaid in the colorized representation 720 with right joints colorized in red and left joints colorized in blue.

An example of depth heatmaps produced by a depth heatmap estimator is portrayed in FIG. 8. The depth estimator generates a separate depth heatmap for each kind of joint. The depth range for each joint is indicated in the horizontal axis. The value (i.e., darkness) of each point along a given heatmap may represent the confidence of the corresponding joint being at that depth. The confidence values of all depths may be zero for a given joint, which may correspond to a joint that is not visible. An estimated depth value may be derived by aggregating the confidence values at different depths.

By combining the 2D joint heatmap with the depth estimation for each kind of joint, a 3D location for each joint can be estimated. A rendering 740 of a skeleton based on these 3D locations is shown.

These described system modules may be separate software modules, separate hardware units or portions of one or more software or hardware components. For example, the software modules may consist of instructions written in a computer language such as the Python programming language, C++ or C # with suitable modules, such as created using software from Caffe, TensorFlow, or Torch, and run on computer hardware, such as a CPU, GPU or implemented on an FPGA. The system may be run on desktop, mobile phone or other platforms such as part of an embedded systems that includes suitable memory for holding the software and activity data. The system may be integrated with or connect to the capture device.

Various embodiments of the present disclosure having been thus described in detail by way of example, it will be apparent to those skilled in the art that variations and modifications may be made without departing from the disclosure. The disclosure includes all such variations and modifications as fall within the scope of the appended claims.

What is claimed is:

1. A method for estimating a three-dimensional (3D) position of a joint of a person through analysis of an image that includes the joint of the person, the method comprising:
providing (i) at least a portion of the image and (ii) a two-dimensional (2D) heatmap that indicates a 2D location of the joint, as input, to a neural network that produces a one-dimensional (1D) heatmap that indicates an estimated depth range for the joint and then produces an estimated depth of the joint by aggregating confidence values at different depths within the estimated depth range,
wherein values in the estimated depth range are representative of confidence of the neural network in the joint being at that depth; and
establishing the 3D position of the joint by combining the 2D location indicated by the 2D heatmap with the estimated depth produced by the neural network.

2. The method of claim 1,
wherein the neural network is a convolutional neural network that contains a 3D convolutional layer, and
wherein at the 3D convolutional layer, 2D resolution is reduced while depth resolution is expanded to produce the estimated depth.

3. The method of claim 1, wherein the joint is one of multiple joints for which estimated depths are produced by the neural network.

4. The method of claim 3, wherein each joint of the multiple joints is associated with a corresponding one of multiple 2D heatmaps that are provided to the neural network as input.

5. The method of claim 3, further comprising:
causing display of a visual representation of the multiple joints in 3D space.

6. The method of claim 5, wherein the visual representation is a skeleton.

7. The method of claim 1, wherein the 1D heatmap visually represents depth relative to a fixed point.

8. A non-transitory medium with instructions stored thereon that, when executed by a processor of a computing system, cause the computing system to perform operations comprising:
providing, to a neural network as input, (i) an image that includes joints of a person and (ii) a heatmap that indicates two-dimensional (2D) locations of the joints, so as to produce estimated depths of the joints,
wherein the neural network is trained using a set of images of persons in different poses, settings, and lighting conditions, and wherein each of the images in the set is associated with at least one label indicating three-dimensional (3D) position of at least one joint;

determining 3D positions of the joints based on the 2D locations indicated by the heatmap and the estimated depths produced by the neural network; and rendering a visual representation of the joints in 3D space.

9. The non-transitory medium of claim 8, wherein the visual representation is rendered on an interface that includes the image and the heatmap.

10. The non-transitory medium of claim 8, wherein the heatmap is representative of a combination of separate heatmaps, each of which is associated with a corresponding one of the joints.

11. The non-transitory medium of claim 8, wherein the estimated depths are represented by heatmaps, each of which indicates a depth range for a corresponding one of the joints.

12. The non-transitory medium of claim 11, wherein for each of the heatmaps, values within the depth range are representative of confidence of the neural network in the corresponding joint being at that depth, and wherein for each of the joints, the estimated depth is derived by aggregating confidence values at different depths within the corresponding depth range.

13. The non-transitory medium of claim 11, wherein the estimated depths are computed from the heatmaps using an argmax function.

14. A computing system comprising:

a processor; and a memory with instructions that, when executed by the processor, cause the computing system to:

obtain images that include a person and that are arranged in temporal order; and for each of the images, obtain a two-dimensional (2D) heatmap that indicates 2D locations of joints, if any, that are visible in that image, provide the 2D heatmap, as input, to a neural network that produces, for each joint that is visible in that image, a one-dimensional (1D) heatmap that indicates an estimated depth range for that joint and then produces an estimated depth for each joint that is visible in that image that joint by aggregating confidence values at different depths within the estimated depth range, and determine a three-dimensional (3D) location of each joint that is visible in that image based on the estimated depth produced by the neural network.

15. The computing system of claim 14, wherein the images are streamed to the computing system from a source external to the computing system.

16. The computing system of claim 14, wherein the instructions further cause the computing system to:

for each of the images, render, in 3D space, a visual representation of the joints visible in that image.

17. The computing system of claim 14, wherein the neural network includes a 3D convolutional layer at which 2D resolution is reduced while depth resolution is expanded.

18. The computing system of claim 17, wherein the 3D convolutional layer includes at least one 3D convolution, at least one rectified linear unit (ReLU), a max pooling layer, and a reshape layer.

19. The computing system of claim 17, wherein the 3D convolutional layer is one of multiple 3D convolutional layers included in the neural network.

* * * * *